Nov. 1, 1927. 1,647,832
J. R. KOVAR
WEED AND ROOT EXTRACTOR
Filed Oct. 14, 1926
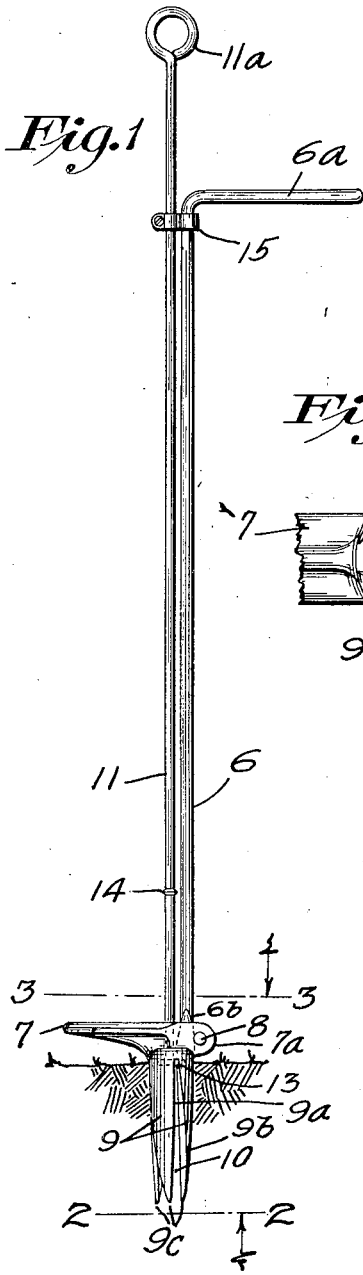
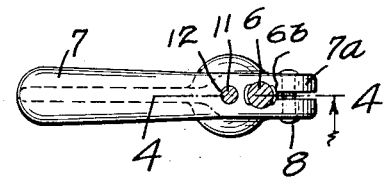
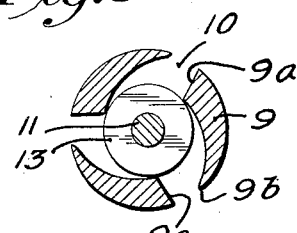
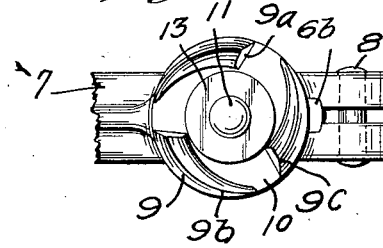
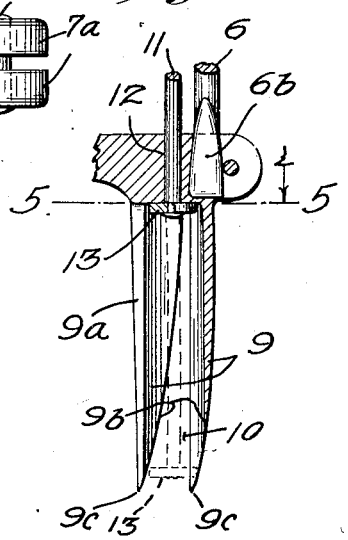
Inventor
John R. Kovar
By his Attorneys
Williamson Reif & Williamson Patented Nov. 1, 1927.

1,647,832

UNITED STATES PATENT OFFICE.

JOHN R. KOVAR, OF OWATONNA, MINNESOTA.

WEED AND ROOT EXTRACTOR.

Application filed October 14, 1926. Serial No. 141,518.

This invention relates to implements for extracting weeds and roots from the soil and has for its principal object to provide an extremely simple but highly efficient device of this kind, adapted to dig out the weed or root and a small amount of soil surrounding the same, lifting out this soil with the weed or root therein and ejecting the same as desired from the implement.

I am aware that other implements have been designed for the above stated purpose, but most have been unsuccessful because the plug containing the weed was not perfectly severed or because the plugs would often fall out when being removed from the soil before the operator intended to eject the same. My invention obviates the above mentioned objections.

The invention is illustrated in the accompanying drawings wherein like characters refer to similar parts throughout the several views, and in which:

Fig. 1 is a side elevation showing a preferred embodiment of the invention in position to extract a weed or root from the soil;

Fig. 2 is a bottom plan view with some portions broken away;

Fig. 3 is a cross section taken on the line 3—3 of Fig. 1;

Fig. 4 is a vertical section of the digging section, taken on the line 4—4 of Fig. 3; and Fig. 5 is a cross section of the blades taken on the line 5—5 of Fig. 4.

Referring to the drawings in detail, I provide an elongated straight handle 6, shown of rod formation having the upper angularly bent arm 6ª and the lower flattened portion 6ᵇ. To the flattened portion of handle 6ᵇ, I attach the digging portion of my device preferably made in a single casting and comprising a horizontally extending foot thrust 7 formed at one end into a split clamping collar 7ª attached to receive the flattened portion 6ᵇ of handle 6 and being clamped thereto by any suitable means such as the rivet 8. Foot thrust 7 forms a head carrying a plurality of depending pointed blades 9 arranged in the general form of a cylinder, with slots 10 extending therebetween.

Each of the blades 9 has a straight relatively thick longitudinal edge 9ª, and a sharpened relatively thin curved edge 9ᵇ, said edges meeting at the points 9ᶜ of the blade. The outer surfaces of blades 9 lie within the walls of an imaginary cylinder, while each blade is of wedge or horn shaped cross section. The spaces or angular slots 10 between the blades are of sufficient size to permit soil to be forced therethrough.

An ejector is provided comprising a straight rod 11 guided through a vertical bearing aperture 12 in foot thrust 7, and ejecting head or washer 13 bolted or otherwise secured to the lower end thereof. Ejecting head 13 fits within the socket formed by the several blades 9, as shown in Figs. 2, 4 and 5, and may be projected downwardly to force out material disposed in said socket. The stop member 14 is preferably mounted on rod 11 to limit the downward movement thereof, while a handle 11ª is formed at the upper end of said rod. A guide collar 15 is secured to rod 11 holding the upper portion thereof in proper position relatively to handle 6.

Operation.

The operation of my device may be briefly described as follows:

The digging head is thrust downwardly into the soil about the root of the plant or weed to be extracted, by means of the foot thrust 7. The handle 6 is then turned or twisted by means of the arm 6ª in a clockwise direction thereby causing the sharpened edges 9ᵇ to sever all the small laterally extending roots and tendrils connected to the main root of the plant. The twisting movement of the digging head, furthermore, causes the soil be to wedged in and packed within the socket formed by the circularly arranged blades. The cross sectional construction of the several blades 9 give an auger or spiral function to the tool. A plug of soil is thus firmly packed within the socket formed by the blades and when the implement is withdrawn by pulling handle 6 upwardly this plug of material will remain within said socket until the operator desires to eject the same. By depressing ejector rod 11, the extracted root and adhering soil may thus be deposited at will in a receptacle. Due to the wedged auger action of the blades, the plug of soil will firmly adhere to the socket and not fall out until displaced by the ejector.

While I prefer to make the foot thrust 7, clamping collar 7ª and blades 9 integrally in a single casting, these parts may, of course, be formed separately and secured together in any suitable manner.

It will, of course, be understood that various changes may be made in the form, details, proportions and arrangement of parts without departing from the scope of the invention.

What is claimed is:

1. An extracting implement of the class described, comprising a handle, a plurality of circumferentially arranged pointed blades carried at one end of said handle and forming a depending socket, said blades each having a relatively thick vertical longitudinal edge and a sharp cutting edge, the several cutting edges being spirally arranged relatively to the axis of said socket, whereby when said socket is thrust into the soil and turned, a plug of soil with a plant therein may be packed within said socket and retained until forcibly ejected.

2. An extracting implement of the class described, comprising an elongated handle, a plurality of circumferentially spaced pointed blades carried at one end of said handle and forming a depending socket, said blades being of wedge shape cross section and each having a relatively thick longitudinal edge and a curved longitudinal cutting edge, the cutting edges of said several blades being spirally arranged relatively to the axis of said socket, whereby when said socket is thrust into the soil and turned, a plug of soil with a plant therein may be packed within said socket and retained until forcibly ejected.

In testimony whereof I affix my signature.

JOHN R. KOVAR.